United States Patent
Yoshitomi et al.

(10) Patent No.: US 8,034,503 B2
(45) Date of Patent: Oct. 11, 2011

(54) FUEL CELL STACK

(75) Inventors: Ryoichi Yoshitomi, Utsunomiya (JP);
Ayumu Ishizuka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/052,800

(22) Filed: Mar. 21, 2008

(65) Prior Publication Data

US 2008/0233459 A1 Sep. 25, 2008

(30) Foreign Application Priority Data

Mar. 23, 2007 (JP) ................................. 2007-077845

(51) Int. Cl.
*H01M 8/02* (2006.01)
*H01M 8/10* (2006.01)
*H01M 8/24* (2006.01)

(52) U.S. Cl. ........................................ 429/452; 429/479

(58) Field of Classification Search .................... 429/12, 429/34, 452, 479
See application file for complete search history.

(56) References Cited

U.S. PATENT DOCUMENTS

| 6,855,448 B2 | 2/2005 | Kikuchi et al. | |
| 2006/0024561 A1* | 2/2006 | Sato et al. | 429/38 |
| 2006/0046127 A1* | 3/2006 | Ishizuka et al. | 429/34 |
| 2007/0054172 A1 | 3/2007 | Ueda | |

FOREIGN PATENT DOCUMENTS

| EP | 1689015 A1 | 8/2006 |
| FR | 2865852 A1 | 8/2005 |
| JP | 2002-298901 | 10/2002 |

OTHER PUBLICATIONS

European Office Action for Application No. 08004940.6-1227, dated May 28, 2008.

\* cited by examiner

*Primary Examiner* — Jerry A Lorengo
*Assistant Examiner* — Jared Wood
(74) *Attorney, Agent, or Firm* — Nelson Mullins Riley & Scarborough LLP; Anthony A. Laurentano

(57) ABSTRACT

A casing includes end plates, side plates, and a hinge mechanism for coupling the end plates and the side plates. A power generation area is defined by the distance L1 and the distance L2. When first hinges and second hinges of the hinge mechanism are provided alternately, the first hinges and the second hinges are positioned within the distance L1. Preferably, the length of the shaft of a coupling pin is not more than the length L1. When the first hinges and the second hinges are provided alternately, the first hinges and the second hinges are positioned within the length L2. Preferably, the length of the shaft of a coupling pin is not more than the length L2.

5 Claims, 6 Drawing Sheets

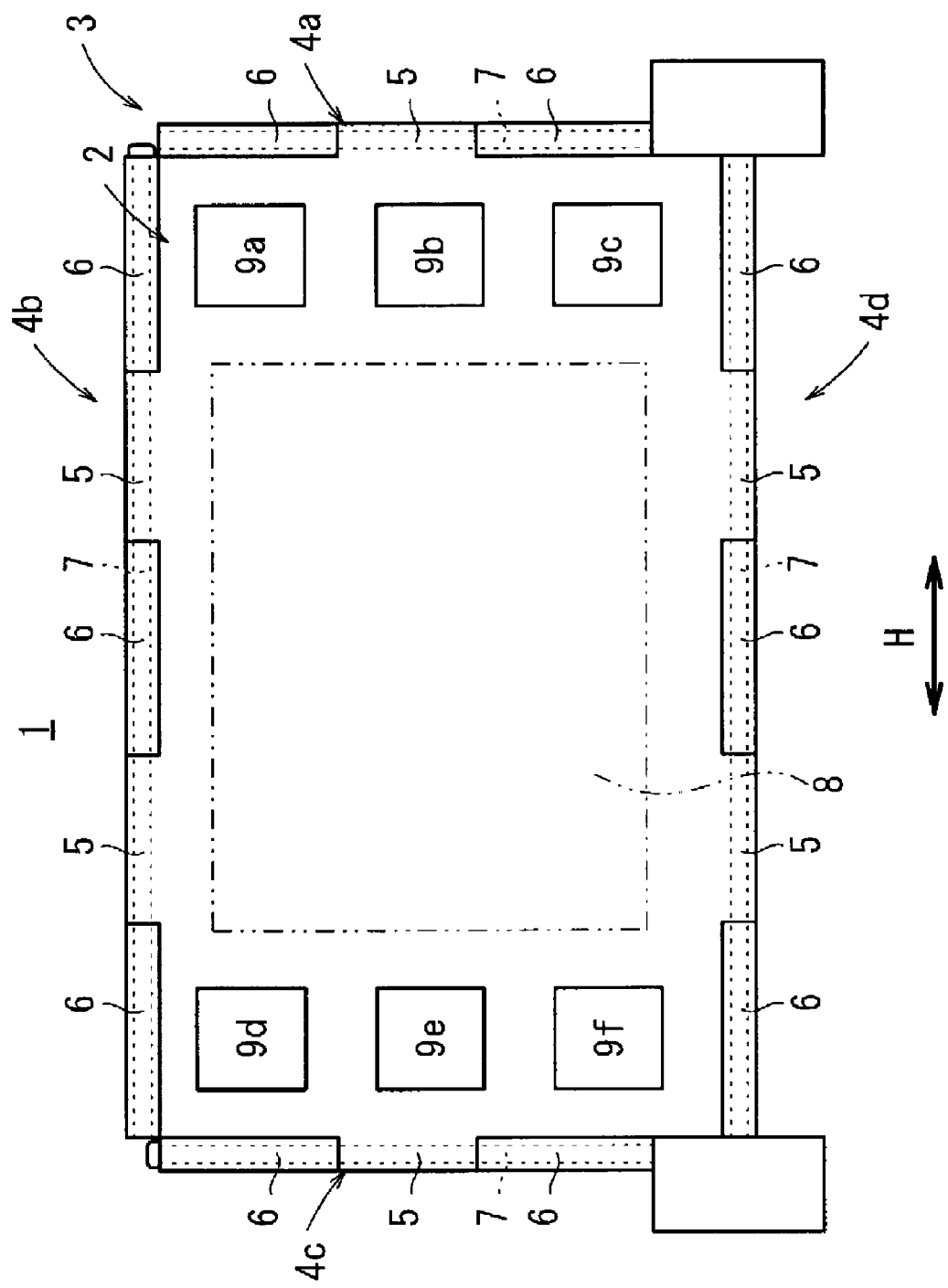

FUEL CELL STACK

BACKGROUND OF THE INVENTION

1. Field of the Invention

The present invention relates to a fuel cell stack including a stack body formed by stacking a plurality of unit cells in a stacking direction and a box-shaped casing containing the stack body. Each of the unit cells includes an electrolyte electrode assembly and separators sandwiching the electrolyte electrode assembly. The electrolyte electrode assembly includes a pair of electrodes and an electrolyte interposed between the electrodes.

2. Description of the Related Art

For example, a solid polymer electrolyte fuel cell employs an electrolyte membrane (electrolyte) comprising a polymer ion exchange membrane. The electrolyte membrane is interposed between an anode and a cathode to form a membrane electrode assembly. The membrane electrode assembly is sandwiched between separators to form a fuel cell.

In use, normally, a predetermined number of (e.g., several tens to several hundreds of) fuel cells are stacked together to form a fuel cell stack to obtain the desired electrical energy. In the fuel cell stack, in order to prevent the increase of the internal resistance in the fuel cells, and degradation of performance of preventing leakage of reactant gases, it is necessary to reliably apply pressures to each of the stacked fuel cells.

In this regard, for example, a fuel cell stack disclosed in Japanese Laid-Open Patent Publication No. 2002-298901 is known. In the fuel cell stack, a stack body is formed by stacking a predetermined number of unit cells, and current collecting terminals (terminal plates) are provided outside the stack body, and end plates are provided outside the current collecting terminals. The end plates are coupled to a casing by a hinge mechanism. The casing includes a plurality of panels provided on upper and lower, and left and right sides between the end plates.

In the structure, the number of components is reduced effectively, and it is possible to use thin end plates. As a result, reduction in the overall size and weight of the fuel cell stack is achieved easily.

In the conventional technique, as shown in FIG. 6, the end plate 2 of the casing 1 is fixed to four side plates 4a, 4b, 4c, and 4d by a hinge mechanism 3. The hinge mechanism 3 includes tabs 5 provided on four sides of the end plates 2, and tabs 6 of the side plates 4a to 4d. The tabs 5 and the tabs 6 are provided alternately. In this state, coupling pins 7 are inserted in these tabs 5, 6.

In the casing 1, a power generation surface 8 is provided, and passages 9a to 9f for supplying an oxygen-containing gas, a fuel gas, and a coolant in a stacking direction are provided on both sides of the power generation surface 8.

In the structure, at the time of assembling the fuel cell stack by placing the unit cells in the casing 1, the desired tightening load is applied to the components between the end plates 2 of the casing 1. Thus, in the hinge mechanism 3, the load applied to the members at the center in the axial direction of the coupling pin 7 is larger than the load applied to the opposite ends in the axial direction.

However, in particular, the coupling pin 7 connecting the end plate 2 and the wide side plates 4b, 4d is significantly long. Therefore, large deformation of the coupling pin 7 may occur easily. Under the circumstances, it is not possible to apply the desired electrode load over the entire power generation surface 8 suitably. Further, a relatively large stress is generated in the hinge mechanism 3 easily, and the strength of the hinge mechanism 3 may be decreased undesirably.

SUMMARY OF THE INVENTION

A main object of the present invention is to provide a fuel cell stack which makes it possible to apply a uniform surface pressure to the entire power generation surface (area) of the electrode, and achieve stress reduction with simple and economical structure.

The present invention relates to a fuel cell stack including a stack body formed by stacking a plurality of unit cells in a stacking direction and a box-shaped casing containing the stack body. Each of the unit cells includes an electrolyte electrode assembly and separators sandwiching the electrolyte electrode assembly. The electrolyte electrode assembly includes a pair of electrodes and an electrolyte interposed between the electrodes.

The casing includes end plates provided at opposite ends of the stack body in the stacking direction, a plurality of side plates provided on sides of the stack body, and a hinge mechanism for coupling the end plates and the side plates. The hinge mechanism is dimensioned such that the hinge mechanism falls within a size of a power generation area of the electrodes.

In the present invention, the hinge mechanism for coupling the end plates and the side plates are dimensioned such that the hinge mechanism falls within the size of the power generation area of the electrode. With the simple and economical structure, it is possible to apply the uniform surface pressure over the entire surface of the power generation area reliably, and achieve the uniform load balance and stress reduction. As a result, the strength of the casing is optimized, and the size of the fuel cell stack is minimized advantageously.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a front view showing a conventional fuel cell stack.

DESCRIPTION OF THE PREFERRED EMBODIMENT

Figure 1:
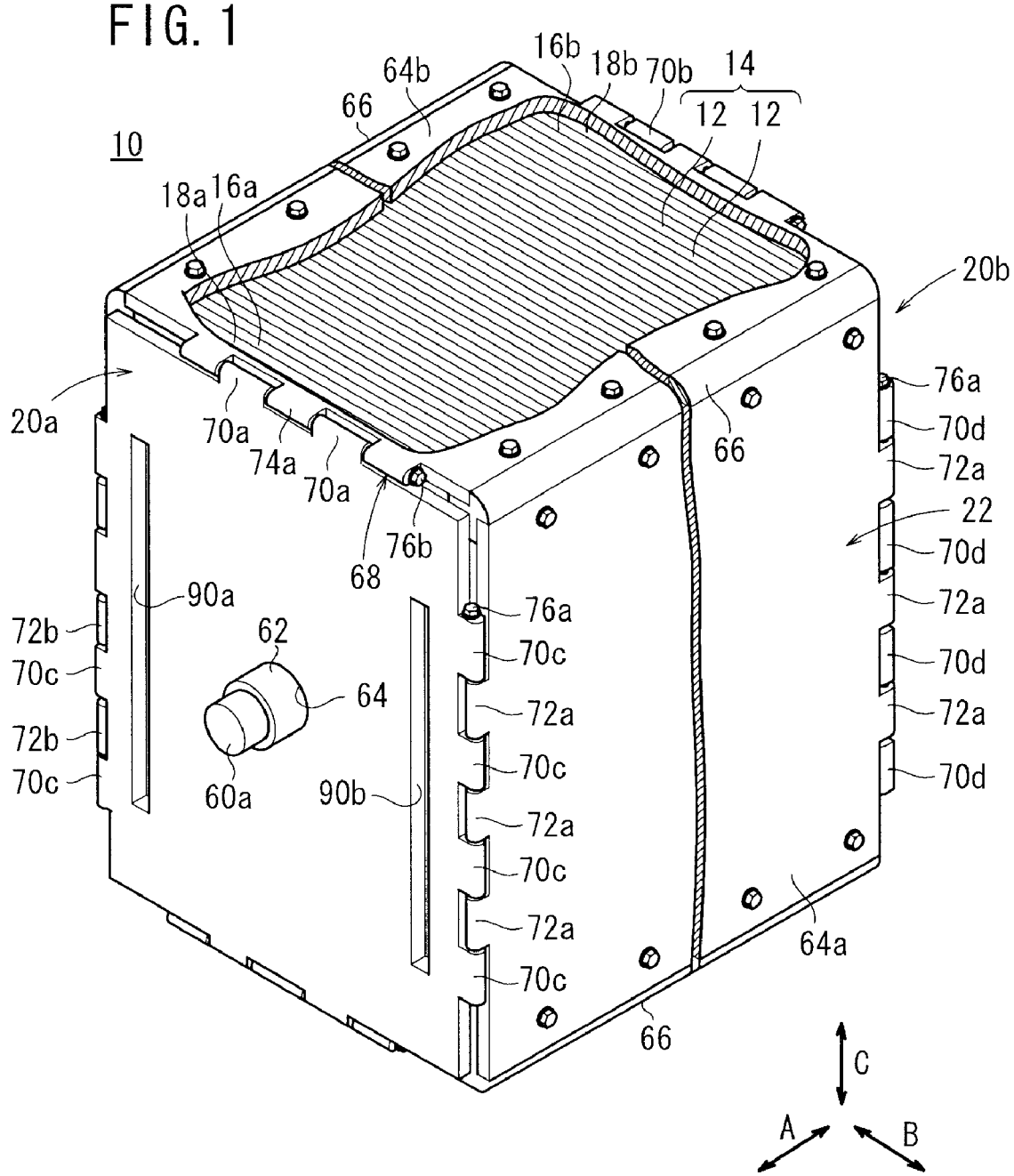
FIG. 1 is a partial-broken perspective view schematically showing a fuel cell stack according to a first embodiment of the present invention.
Figure 2:
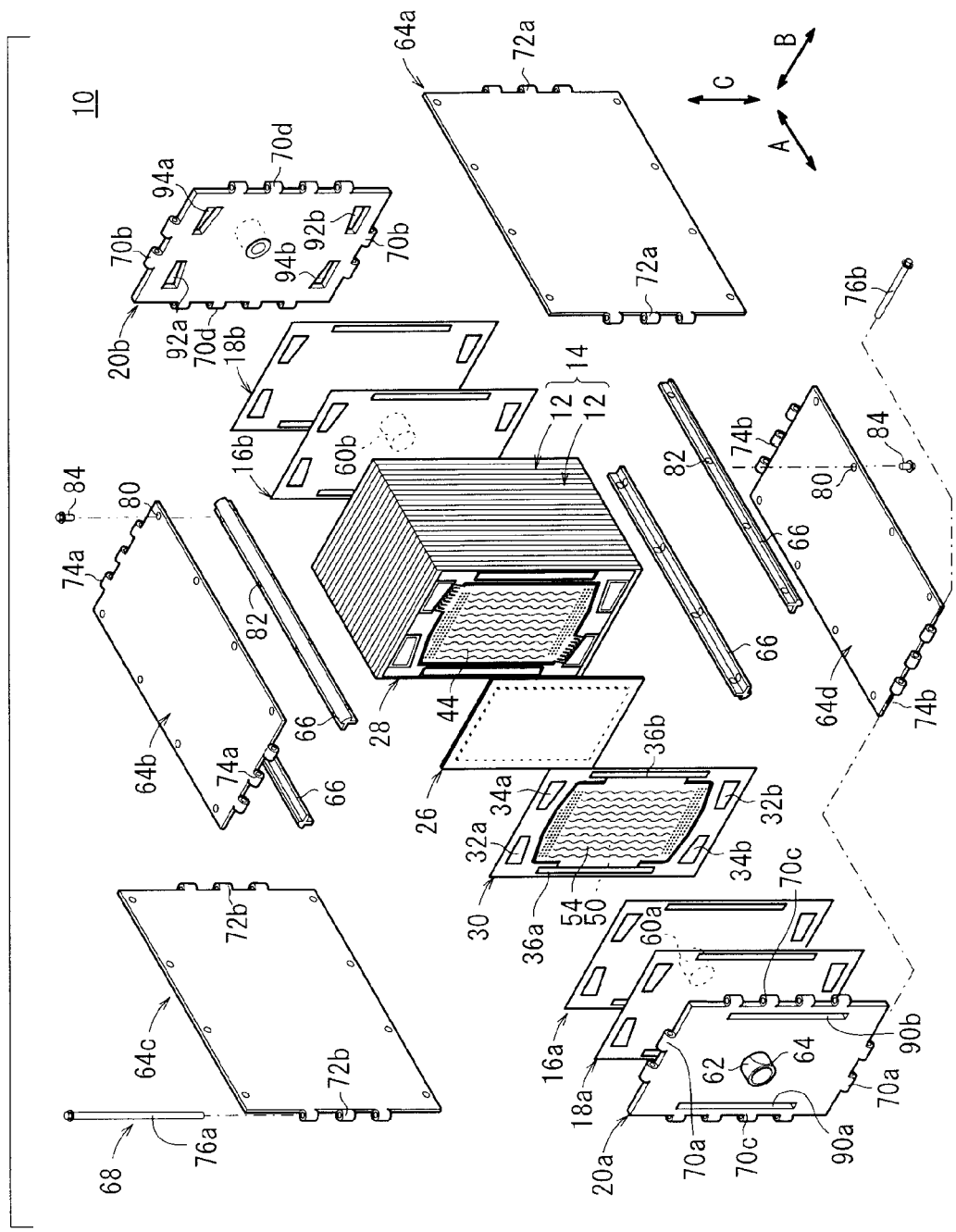
FIG. 2 is a partial exploded perspective view schematically showing the fuel cell stack.

FIG. 1 is a partial-broken perspective view schematically showing a fuel cell stack 10 according to a first embodiment of the present invention, and FIG. 2 is a partial exploded perspective view schematically showing the fuel cell stack 10.

The fuel cell stack 10 includes a stack body 14 formed by stacking a plurality of unit cells 12 horizontally in a direction indicated by an arrow A. At one end of the stack body 14 in the stacking direction indicated by the arrow A, a terminal plate 16a is provided. An insulating plate 18a is provided outside the terminal plate 16a, and an end plate 20a is provided outside the insulating plate 18a. At the other end of the stack body 14 in the stacking direction, a terminal plate 16b is provided. An insulating plate 18b is provided outside the terminal plate 16b, and an end plate 20b is provided outside the insulating plate 18b. The fuel cell stack 10 is placed in a casing 22 having the rectangular end plates 20a, 20b.

Figure 3:
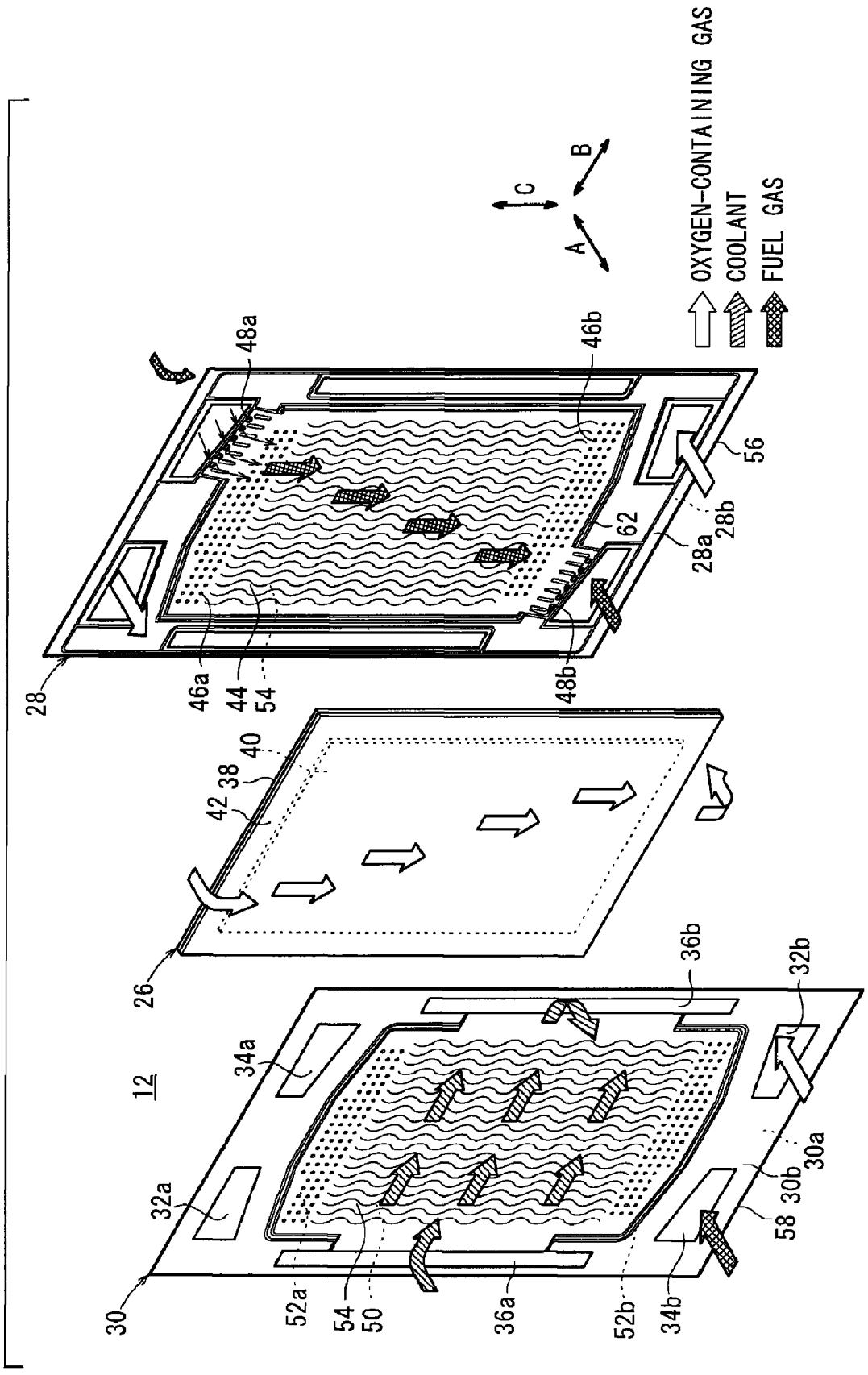
FIG. 3 is an exploded perspective view showing a unit cell of the fuel cell stack.

As shown in FIG. 3, each of the unit cells 12 is formed by sandwiching a membrane electrode assembly (electrolyte electrode assembly) 26 between a first metal separator (anode side separator) 28 and a second metal separator (cathode side separator) 30. The first metal separator 28 and the second metal separator 30 have ridges and protrusions in cross section by corrugating thin metal plates by press forming.

For example, the first metal separator 28 and the second metal separator 30 are steel plates, stainless steel plates, aluminum plates, plated steel sheets, or metal plates having anti-corrosive surfaces by surface treatment. Instead of the first and second metal separators 28, 30, for example, carbon separators may be used.

At an upper end of the unit cell 12 in a longitudinal direction indicated by an arrow C in FIG. 3, an oxygen-containing gas supply passage 32a for supplying an oxygen-containing gas and a fuel gas supply passage 34a for supplying a fuel gas such as a hydrogen-containing gas are provided. The oxygen-containing gas supply passage 32a and the fuel gas supply passage 34a extend through the unit cell 12 in the direction indicated by the arrow A.

At a lower end of the unit cell 12 in the longitudinal direction, a fuel gas discharge passage 34b for discharging the fuel gas and an oxygen-containing gas discharge passage 32b for discharging the oxygen-containing gas are provided. The fuel gas discharge passage 34b and the oxygen-containing gas discharge passage 32b extend through the unit cell 12 in the direction indicated by the arrow A.

At one end of the unit cell 12 in a lateral direction indicated by an arrow B, a coolant supply passage 36a for supplying a coolant is provided. At the other end of the unit cell 12 in the lateral direction, a coolant discharge passage 36b for discharging the coolant is provided. The coolant supply passage 36a and the coolant discharge passage 36b extend through the unit cell 12 in the direction indicated by the arrow A.

The membrane electrode assembly 26 includes an anode 40, a cathode 42, and a solid polymer electrolyte membrane 38 interposed between the anode 40 and the cathode 42. The solid polymer electrolyte membrane 38 is formed by impregnating a thin membrane of perfluorosulfonic acid with water, for example. The surface area of the anode 40 is smaller than the surface area of the cathode 42.

Each of the anode 40 and the cathode 42 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 40 and the electrode catalyst layer of the cathode 42 are formed on both surfaces of the solid polymer electrolyte membrane 38, respectively.

The first metal separator 28 has a fuel gas flow field 44 on its surface 28a facing the membrane electrode assembly 26. The fuel gas flow field 44 is connected between the fuel gas supply passage 34a and the fuel gas discharge passage 34b. The fuel gas flow field 44 comprises a plurality of corrugated grooves extending in the direction indicated by the arrow C. An inlet buffer 46a is provided at an upper end of the fuel gas flow field 44, and an outlet buffer 46b is provided at a lower end of the fuel gas flow field 44.

A plurality of supply holes 48a and a plurality of discharge holes 48b are formed on the surface 28a of the first metal separator 28. The supply holes 48a connect the fuel gas supply passage 34a and the inlet buffer 46a, and the discharge holes 48b connect the fuel gas discharge passage 34b and the outlet buffer 46b.

The second metal separator 30 has an oxygen-containing gas flow field 50 on its surface 30a facing the membrane electrode assembly 26. The oxygen-containing gas flow field 50 is connected between the oxygen-containing gas supply passage 32a and the oxygen-containing gas discharge passage 32b. The oxygen-containing gas flow field 50 comprises a plurality of corrugated grooves extending in the direction indicated by the arrow C. An inlet buffer 52a is provided at an upper end of the oxygen-containing gas flow field 50, and an outlet buffer 52b is provided at a lower end of the oxygen-containing gas flow field 50.

A coolant flow field 54 is formed between a surface 30b of the second metal separator 30 and a surface 28b of the first metal separator 28. The coolant flow field 54 is connected between the coolant supply passage 36a and the coolant discharge passage 36b. That is, the coolant flow field 54 is formed by overlapping the back surface of the fuel gas flow field 44 and the back surface of the oxygen-containing gas flow field 50. The coolant flow field 54 extends in the direction indicated by the arrow B.

A first seal member 56 is formed integrally on the surfaces 28a, 28b of the first metal separator 28, around the outer end of the first metal separator 28. A second seal member 58 is formed integrally on the surfaces 30a, 30b of the second metal separator 30, around the outer end of the second metal separator 30. For example, the first and second seal members 56, 58 are made of seal material, cushion material or packing material such as EPDM (Ethylene Propylene Diene Monomer), NBR (Nitrile Butadiene Rubber), fluoro rubber, silicone rubber, fluoro silicone rubber, butyl rubber (Isobutene-Isoprene Rubber), natural rubber, styrene rubber, chloroprene rubber, or acrylic rubber.

As shown in FIGS. 1 and 2, a first current collecting terminal 60a extends outwardly in the stacking direction, at a position spaced upwardly by a predetermined distance from the center in the surface of the terminal plate 16a. The first current collecting terminal 60a is inserted into an insulating cylindrical portion 62, and in this state, the first current collecting terminal 60a passes through the insulating plate 18a and a hole 64 of the end plate 20a, and protrudes outwardly. Likewise, a second current collecting terminal 60b extends outwardly in the stacking direction, at a position spaced upwardly by a predetermined distance from the center in the surface of the terminal plate 16b (see FIG. 2).

As shown in FIGS. 1 and 2, the casing 22 includes the end plates 20a, 20b, a plurality of side plates 64a to 64d provided on sides of the stack body 14, angle members 66 for coupling adjacent ends of the side plates 64a to 64d, and a hinge mechanism 68 for coupling the end plates 20a, 20b and the side plates 64a to 64d. The side plates 64a to 64d are thin metal plates.

The hinge mechanism 68 includes two first hinges 70a, 70b provided at each of upper and lower sides of the end plates 20a, 20b, and four first hinges 70c, 70d provided at each of left and right sides of the end plates 20a, 20b.

As shown in FIG. 2, the hinge mechanism 68 further includes three second hinges 72a, 72b provided at each of longitudinal ends (in the direction indicated by the arrow A) of the side plates 64a, 64c provided on both sides of the stack body 14 in the direction indicated by the arrow B, and three second hinges 74a, 74b provided at each of longitudinal ends of the side plates 64b, 64d provided on both of upper and lower sides of the stack body 14.

The three second hinges 72a, 72b of the side plates 64a, 64c and the four first hinges 70c, 70d of each of both sides of the end plates 20a, 20b are provided alternately, and the long coupling pins 76a are inserted into these hinges to couple the side plates 64a, 64c to the end plates 20a, 20b together.

Likewise, the three second hinges 74a, 74b of the side plates 64a, 64b and the first hinges 70a, 70b on the upper and lower sides of the end plates 20a, 20b are provided alternately, and the short coupling pins 76b are inserted into these hinges to couple the side plates 64b, 64d and the end plates 20a, 20b together.

Figure 4:
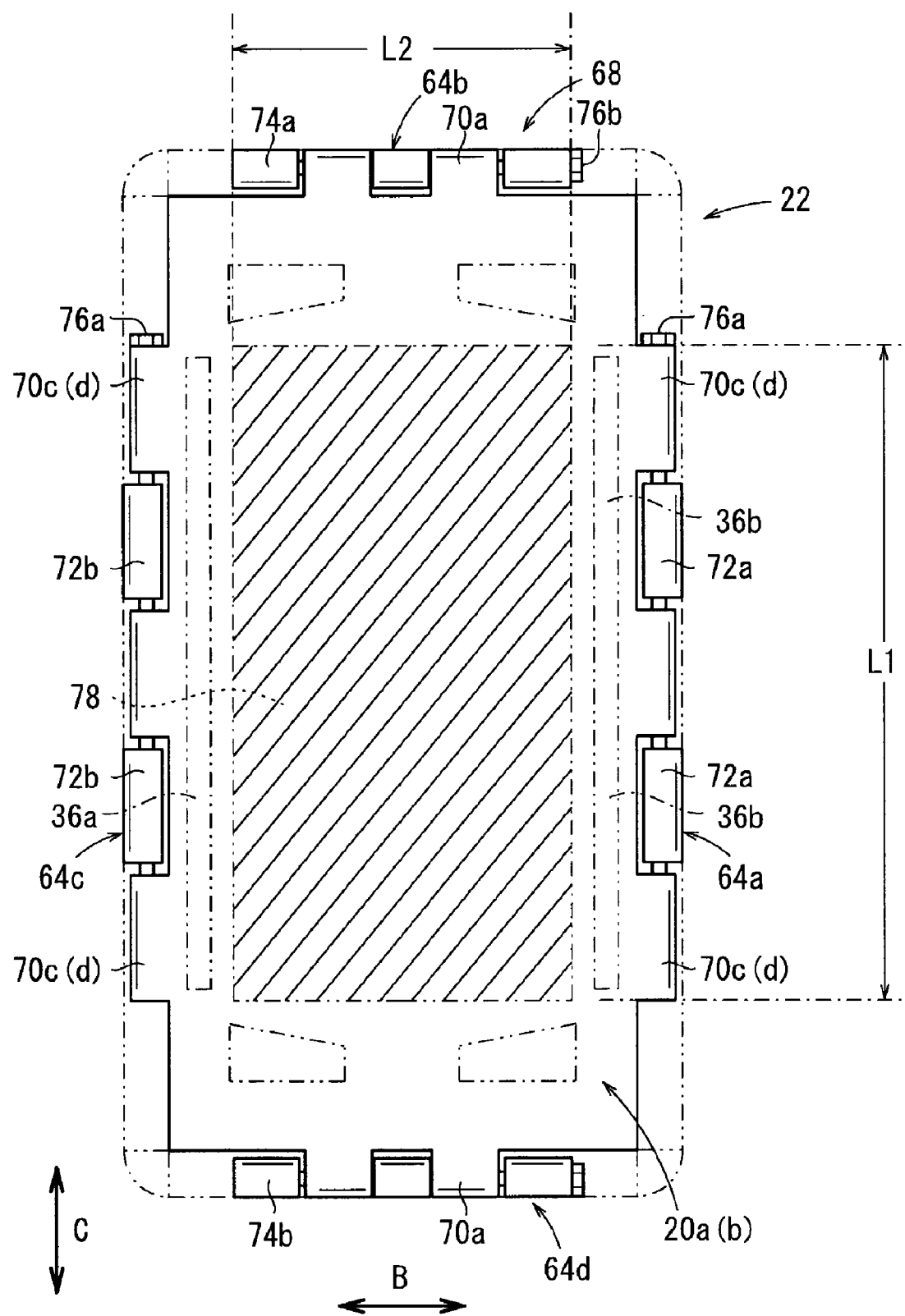
FIG. 4 is a front view showing the fuel cell stack.

As shown in FIG. 4, the hinge mechanism 68 is dimensioned such that the hinge mechanism 68 falls within a size of a power generation area 78 of the anode 40 and the cathode 42. Specifically, the power generation area 78 is defined by the distance L1 in the direction indicated by the arrow C and the distance L2 in the direction indicated by the arrow B. When the first hinges 70c and the second hinges 72a of the hinge mechanism 68 are provided alternately, the first hinges 70c and the second hinges 72a are positioned within the distance L1 in the direction indicated by the arrow C. Preferably, the size of the shaft of the coupling pin 76a is not more than the distance L1.

Likewise, when the first hinges 70a and the second hinges 74a of the hinge mechanism 68 are provided alternately, the first hinges 70a and the second hinges 74a are positioned within the distance L2 in the direction indicated by the arrow B. Preferably, the size of the shaft of the coupling pin 76b is not more than the distance L2.

The present embodiment is particularly advantageous in the case where the distance L1 is larger than the distance L2 (L1>L2), and the value of the distance L1 is significantly larger than the value of the distance L2. More specifically, preferably, the relationship of the distance L1>the distance L2×1.5 is satisfied.

As shown in FIG. 2, the side plates 64a to 64d have a plurality of holes 80 at both of the lateral ends, respectively. Screw holes 82 corresponding to the holes 80 are formed in the respective sides of the angle members 66. Screws 84 inserted into the holes 80 are screwed into the screw holes 82 to fix the side plates 64a to 64d together through the angle members 66. In this manner, the casing 22 is fabricated (see FIG. 1).

Alternatively, angle members 66 may have holes, and the side plates 64a to 64d may have screw holes. In this case, the angle members 66 are placed outside the side plates 64a to 64d for fixing the angle members 66 and the side plates 64a to 64d together.

As shown in FIGS. 1 and 2, a coolant inlet manifold 90a and a coolant outlet manifold 90b extending in the direction indicated by the arrow C are provided at the end plate 20a. The coolant inlet manifold 90a is connected to the coolant supply passage 36a, and the coolant outlet manifold 90b is connected to the coolant discharge passage 36b.

As shown in FIG. 2, an oxygen-containing gas inlet manifold 92a and a fuel gas inlet manifold 94a are provided at upper positions of the end plate 20b. The oxygen-containing gas inlet manifold 92a is connected to the oxygen-containing gas supply passage 32a, and the fuel gas inlet manifold 94a is connected to the fuel gas supply passage 34a. An oxygen-containing gas outlet manifold 92b and a fuel gas outlet manifold 94b are provided at lower positions of the end plate 20b. The oxygen-containing gas outlet manifold 92b is connected to the oxygen-containing gas discharge passage 32b, and the fuel gas outlet manifold 94b is connected to the fuel gas discharge passage 34b.

Next, operation of the fuel cell stack 10 will be described below.

In the fuel cell stack 10, firstly, an oxygen-containing gas is supplied from the oxygen-containing gas inlet manifold 92a of the end plate 20b to the oxygen-containing gas supply passage 32a, and a fuel gas such as a hydrogen-containing gas is supplied from the fuel gas inlet manifold 94a to the fuel gas supply passage 34a. Further, a coolant such as pure water or ethylene glycol is supplied from the coolant inlet manifold 90a at the end plate 20a to the coolant supply passage 36a.

Thus, in the stack body 14, the oxygen-containing gas, the fuel gas, and the coolant are supplied to the unit cells 12 stacked together in the direction indicated by the arrow A.

As shown in FIG. 3, the oxygen-containing gas flows from the oxygen-containing gas supply passage 32a to the oxygen-containing gas flow field 50 of the second metal separator 30, and flows along the cathode 42 of the membrane electrode assembly 26 for inducing an electrochemical reaction at the cathode 42. The fuel gas flows from the fuel gas supply passage 34a to the fuel gas flow field 44 through the supply holes 48a of the first metal separator 28, and flows along the anode 40 of the membrane electrode assembly 26 for inducing an electrochemical reaction at the anode 40.

Thus, in each of the membrane electrode assemblies 26, the oxygen-containing gas supplied to the cathode 42, and the fuel gas supplied to the anode 40 are consumed in the electrochemical reactions at catalyst layers of the cathode 42 and the anode 40 for generating electricity.

Then, the oxygen-containing gas consumed at the cathode 42 flows along the oxygen-containing gas discharge passage 32b, and is discharged to the outside from the oxygen-containing gas outlet manifold 92b at the end plate 20b. Likewise, the fuel gas consumed at the anode 40 flows through the discharge holes 48b, and flows along the fuel gas discharge passage 34b. Then, the fuel gas is discharged to the outside from the fuel gas outlet manifold 94b at the end plate 20b.

The coolant flows from the coolant supply passage 36a into the coolant flow field 54 between the first and second metal separators 28, 30, and flows in the direction indicated by the arrow B. After the coolant cools the membrane electrode assembly 26, the coolant flows along the coolant discharge passage 36b, and is discharged from the coolant outlet manifold 90b of the end plate 20a.

In the first embodiment, as shown in FIG. 4, the first hinges 70c and the second hinges 72a of the hinge mechanism 68 are provided alternately, and positioned within the distance L1 in the direction indicated by the arrow C. Preferably, the length of the shaft of the coupling pin 76a is not more than the distance L1. Likewise, the first hinges 70a and the second hinges 74a of the hinge mechanism 68 are provided alternately, and positioned within the length L2 in the direction indicated by the arrow B. Preferably, the length of the shaft of the coupling pin 76b is not more than the distance L2.

Assuming that the hinge mechanism 68 does not fall within the size of the power generation area 78, the shafts of the coupling pins 76a, 76b become significantly long. Therefore, the load applied to the outside of the power generation area 78 becomes significantly small. Thus, in the hinge mechanism 68, the load is locally applied to the center of the power generation area 78, and the coupling pins 76a, 76b may be deformed significantly.

In consideration of the above, in the first embodiment, the hinge mechanism 68 is within the size of the power generation area 78. In the structure, the lengths of the coupling pins 76a, 76b are reduced effectively. Thus, with the simple and economical structure, it is possible to apply the uniform surface pressure over the entire surface of the power generation area 78, and achieve the uniform load balance and stress reduction. As a result, the strength of the casing 22 is optimized, and the size of the fuel cell stack 10 is minimized advantageously.

Figure 5:
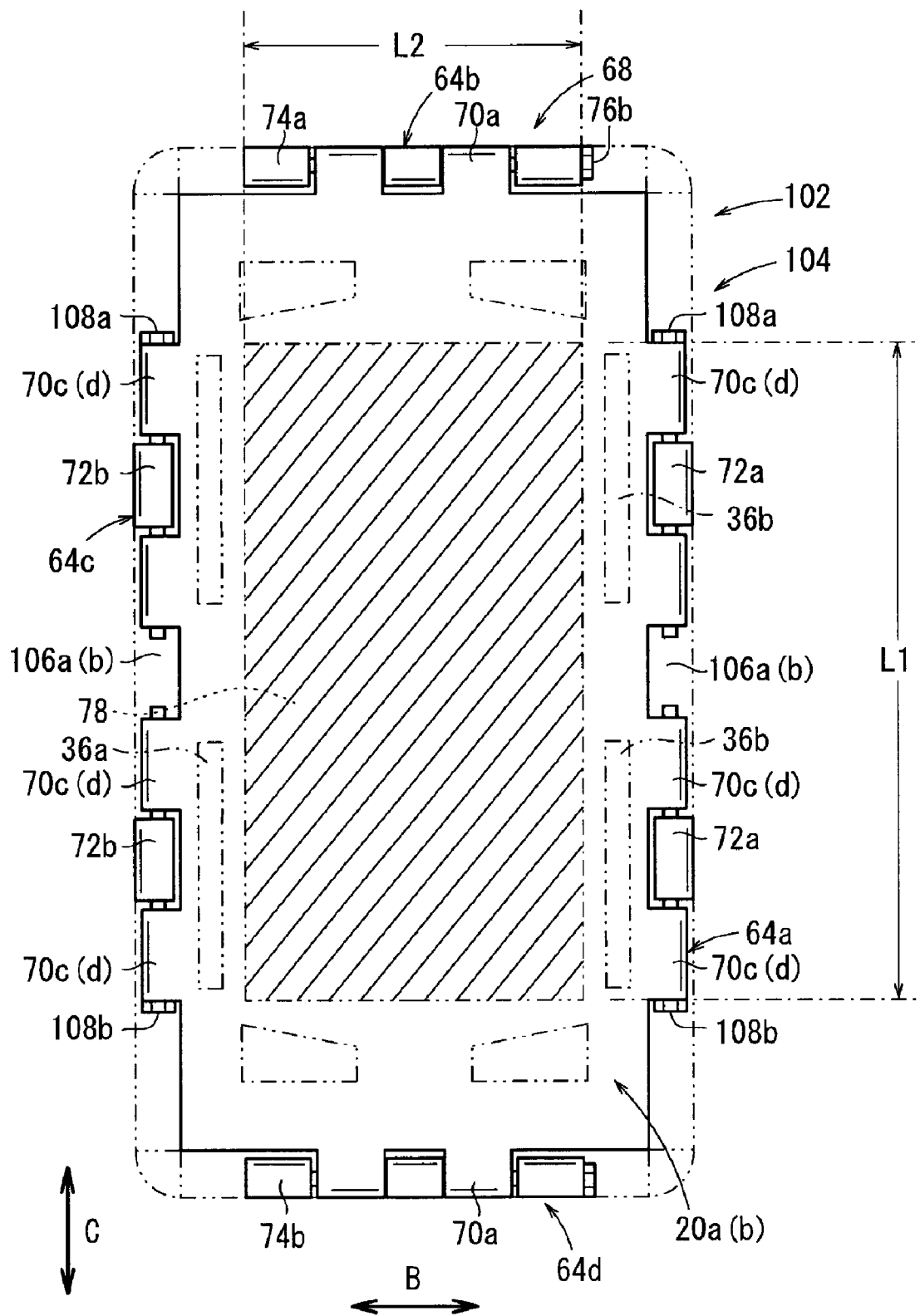
FIG. 5 is a front view showing a fuel cell stack according to a second embodiment of the present invention.

FIG. 5 is a front view showing a fuel cell stack 100 according to a second embodiment of the present invention. The constituent elements that are identical to those of the fuel cell stack 10 according to the first embodiment are labeled with the same reference numeral, and description thereof will be omitted.

In the second embodiment, two or four coolant supply passages 36a are provided at one end in the direction indicated by the arrow B, and two or four coolant discharge passages 36b are provided at the other end in the direction indicated by the arrow B.

A casing 102 of the fuel cell stack 100 has a hinge mechanism 104. In the hinge mechanism 104, a plurality of first hinges 70c, 70d are provided on both of the left and the right sides of the end plates 20a, 20b, and the first hinges 70c, 70d are separated by providing spaces 106a, 106b at vertically substantially central positions. In the side plates 64a, 64c, second hinges 72a, 72b and the first hinges 70c, 70d are provided alternately, and likewise, the second hinges 72a, 72b are vertically separated into two parts by the spaces 106a, 106b.

Coupling pins 108a are inserted into the first hinges 70c, 70d and the second hinges 72a, 72b on the upper side, and coupling pins 108b are inserted into the first hinges 70c, 70d and the second hinges 72a, 72b on the lower side. As in the case of the hinge mechanism 68, the hinge mechanism 104 is dimensioned such that the hinge mechanism 104 falls within the size of the power generation area 78 of the anode 40 and the cathode 42.

In the second embodiment, the hinge mechanism 104 has the two coupling pins 108a, 108b on the long sides of the end plates 20a, 20b, i.e., within the distance L1. Thus, in comparison with the structure in which the single coupling pin 76a is used, the lengths of the coupling pins 108a, 108b are reduced by half or more.

As a result, with the simple and economical structure, the same advantages as in the case of the first embodiment can be obtained. For example, it is possible to apply the uniform surface pressure over the entire surface of the power generation area 78.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising:
a stack body formed by stacking a plurality of unit cells in a stacking direction, said unit cells each including an electrolyte electrode assembly and separators sandwiching said electrolyte electrode assembly, said electrolyte electrode assembly including a pair of electrodes, said electrodes having a power generation area, and an electrolyte interposed between said electrodes; and
a box-shaped casing containing said stack body,
said casing comprising:
end plates provided at opposite ends of said stack body in the stacking direction;
a plurality of side plates provided on sides of said stack body; and
a hinge mechanism provided at each side of each of said end plates for coupling said end plates and said side plates, each side of said end plate corresponding to a side of said power generation area, wherein each hinge mechanism includes all hinges on one side of the end plate and all hinges on a side of the side plate that corresponds to the one side of the end plate,
wherein the fuel cell stack is provided in the casing in a configuration that causes a tightening load to be applied to the fuel cell stack, the tightening load generating a corresponding stress in the hinge mechanism, and
wherein a length of said hinge mechanism on each side of said end plates is the same or smaller than a length of a corresponding side of said power generation area to thereby promote a uniform surface pressure over an entire surface of the power generation area.

2. A fuel cell stack according to claim 1, wherein a shape of said power generation area is rectangular, and
said hinge mechanism includes a plurality of hinges for inserting a coupling pin into said hinges, and said hinges are provided along each side of the power generation area, and positioned within an area of not more than the length of each side.

3. A fuel cell stack according to claim 2, wherein said power generation area has a length L1 of a long side and a length L2 of a short side satisfies the relationship of L1>1.5× L2.

4. A fuel cell stack according to claim 3, wherein two of coupling pins are coaxially inserted into said hinges provided along a long side of said power generation area.

5. A fuel cell stack according to claim 1, wherein a plurality of fluid passages for reactant gases and a coolant extend through said units cells in the stacking direction, and said fluid passages are formed outside said power generation area of said electrodes.

* * * * *